United States Patent [19]

Townsend

[11] Patent Number: 4,694,536
[45] Date of Patent: Sep. 22, 1987

[54] COMPOUND PUMP MECHANISM FOR MEAT ENCASING MACHINES AND THE LIKE

[75] Inventor: Ray T. Townsend, Des Moines, Iowa

[73] Assignee: Townsend Engineering Company, Des Moines, Iowa

[21] Appl. No.: 941,376

[22] Filed: Dec. 15, 1986

[51] Int. Cl.$^4$ .............................................. A22C 11/08
[52] U.S. Cl. ...................................... 17/37; 141/100; 99/450.1; 17/49
[58] Field of Search ............... 222/139, 140, 255, 252, 222/273; 99/450.7; 426/513; 141/234, 236, 100; 17/37, 35, 49

[56] References Cited

U.S. PATENT DOCUMENTS

| 3,013,650 | 12/1961 | Toby | 17/37 X |
| 3,486,662 | 12/1969 | Petyt et al. | 222/139 X |
| 3,942,204 | 3/1976 | Gruy | 141/100 X |

Primary Examiner—Willie G. Abercrombie
Attorney, Agent, or Firm—Zarley, McKee, Thomte, Voorhees & Sease

[57] ABSTRACT

A compound pump mechanism is provided adjacent the inlet ends of concentrically positioned inner and outer stuffing horns or tubes of a meat encasing machine. The first pump mechanism is in communication with a source of conventional meat emulsion, and is powered by a vertically disposed power shaft. This power shaft extends into the housing of a second pump mounted adjacent to, and preferably on top of, the first pump housing. The drive shaft of the first pump housing operates the pump mechanism in the second pump housing.

Both pumps have inlet and outlet ports for conveying material to be pumped. The outlet ports of both pumps discharge the pumped material into a block element which slidably receives the ends of two concentrically positioned inner and outer stuffing horns. The pumped material from the second pump housing delivers pumped material into the end of the inner stuffing horn, and the pumped material from the first pump delivers meat emulsion or the like into the the end of the outer stuffing horn.

The housing of the upper pump or second pump contains a vane-type pumping mechanism. The pumping capacity of that pumping mechanism is selectively controlled by pivoting the position of the second pump housing with respect to the first pump housing.

24 Claims, 8 Drawing Figures

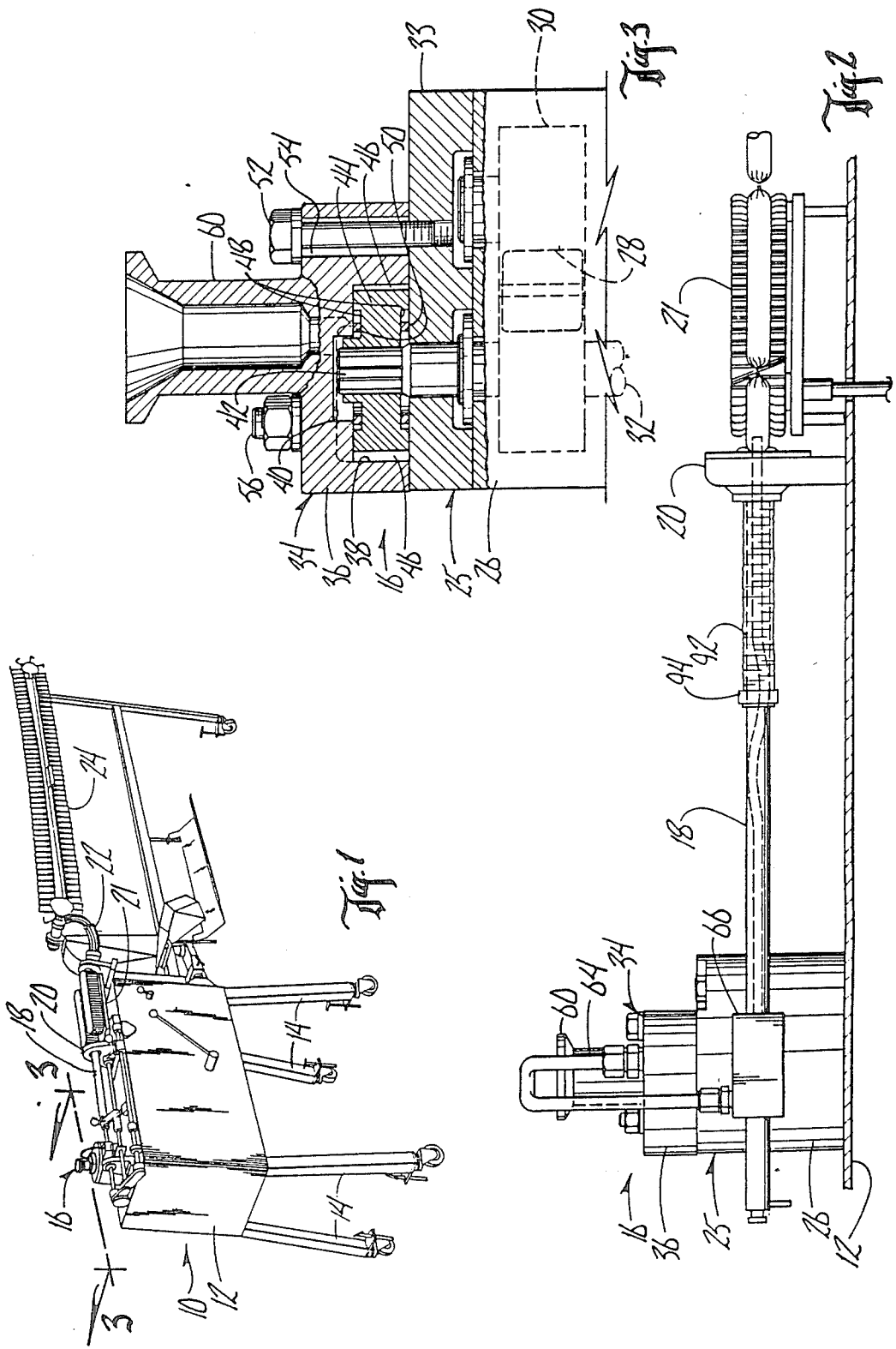

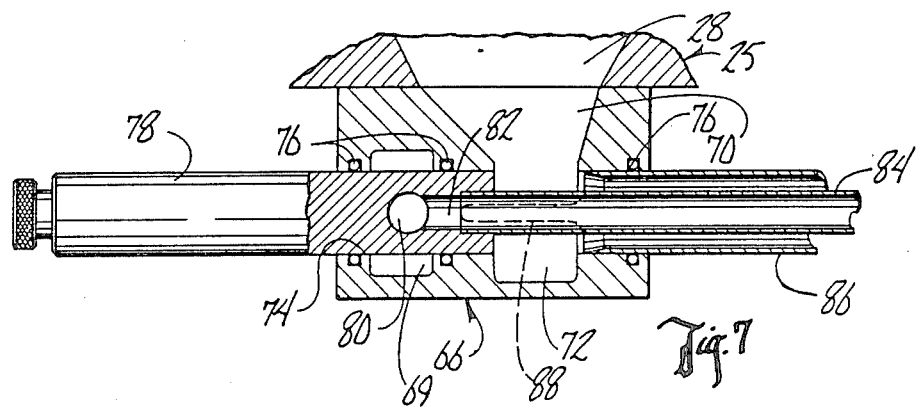
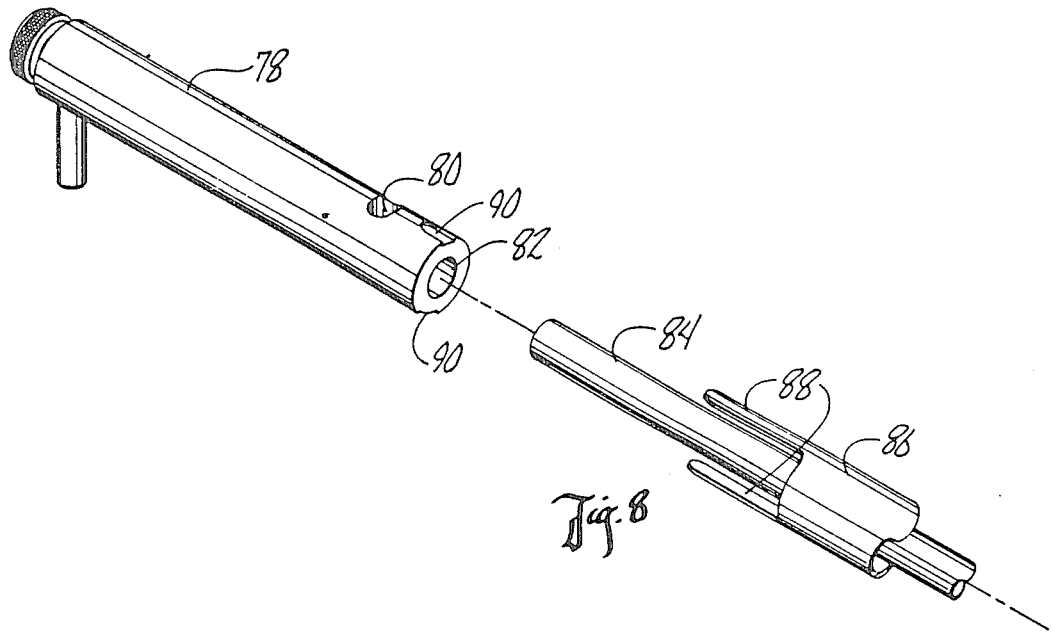

COMPOUND PUMP MECHANISM FOR MEAT ENCASING MACHINES AND THE LIKE

BACKGROUND OF THE INVENTION

The art of simultaneously extruding a meat emulsion material into a casing while also extruding a second material such as chili or cheese into the interior of the casing to ultimately form a frankfurter or the like filled with the interior material is an old art. However, efforts to practice this art on modern meat encasing machines, such as that generally shown in U.S. Pat. No. 3,115,668, have not met with the success that is necessary to adapt this process to rapid, mass production requirements.

For example, recent efforts to make this adaption of filling the center of a frankfurter or the like with a condiment is illustrated in U.S. Pat. Nos. 4,569,101 and 4,570,298. However, it is believed that the concept of these patents interferes with the free flow of the material being used and this results in damage to the material being utilized. Also, the devices of these patents and others are complex in construction, less sturdy than is desired for mass production requirements, and more difficult to clean.

In addition, difficulty exists with prior art devices insofar as controlling the coordinated rate of extruding two materials simultaneously into the casing material.

Therefore, it is an object of this invention to provide a compound pump mechanism for meat encasing machines and the like whereby dual pumps are used for the dual extrusion process and wherein the pumping operations of the two pumps can be carefully coordinated and controlled.

A further object of this invention is to provide a compound pump mechanism for meat encasing machines and the like wherein two pumps are provided with a single source of operational power.

A still further object of this invention is to provide a compound pump mechanism, wherein the pumping capacity of one pump can be selectively adjusted with respect to the other pump.

A still further object of this invention is to provide a compound pump mechanism wherein two pumps are powered by the same common drive shaft with the pump capacity of one pump being selectively adjustable with respect to the other pump, and wherein the speed of operation of the common drive shaft will maintain the proportionate pumping capacities of both pumps.

A still further object of this invention is to provide a compound pump mechanism, wherein dual pumps can deliver material being pumped to the ends of concentrically positioned inner and outer stuffing horns without damaging the pumped material.

A still further object of this invention is to provide a compound pump mechanism, wherein the entire apparatus can be easily cleaned and wherein the pumping structure and the means for supplying the pumped material to the ends of the concentrically arranged stuffing horns are simple of manufacture, and structurally sound.

These and other objects will be apparent to those skilled in the art.

SUMMARY OF THE INVENTION

A compound pump mechanism is provided adjacent the inlet ends of concentrically positioned inner and outer stuffing horns or tubes of a meat encasing machine. The first pump mechanism is in communication with a source of conventional meat emulsion, and is powered by a vertically disposed power shaft. This power shaft extends into the housing of a second pump mounted adjacent to, and preferably on top of, the first pump housing. The drive shaft of the first pump housing operates the pump mechanism in the second pump housing.

Both pumps have inlet and outlet ports for conveying material to be pumped. The outlet ports of both pumps discharge the pumped material into a block element which slidably receives the ends of two concentrically positioned inner and outer stuffing horns. The pumped material from the second pump housing delivers pumped material into the end of the inner stuffing horn, and the pumped material from the first pump delivers meat emulsion or the like into the end of the outer stuffing horn.

The housing of the upper pump or second pump contains a vane-type pumping mechanism. The pumping capacity of that pumping mechanism is selectively controlled by pivoting the position of the second pump housing with respect to the first pump housing.

DESCRIPTION OF THE DRAWINGS

FIG. 1 is a perspective view of a meat encasing machine incorporating the compound pump mechanism and stuffing horn coupling of the present invention;

FIG. 2 is a partial elevational view shown at an enlarged scale of the essential components of the machine shown in FIG. 1;

FIG. 3 is an enlarged scale vertical sectional view taken through the two pump mechanism as viewed on line 3—3 of FIG. 1;

FIG. 7 is a partial sectional view taken on line 7—7 of FIG. 6; and

FIG. 8 is an exploded view showing the detailed construction of a plug element which serves to support in part the concentrically mounted inner and outer stuffing tubes.

DESCRIPTION OF THE PREFERRED EMBODIMENT

Figure 4:
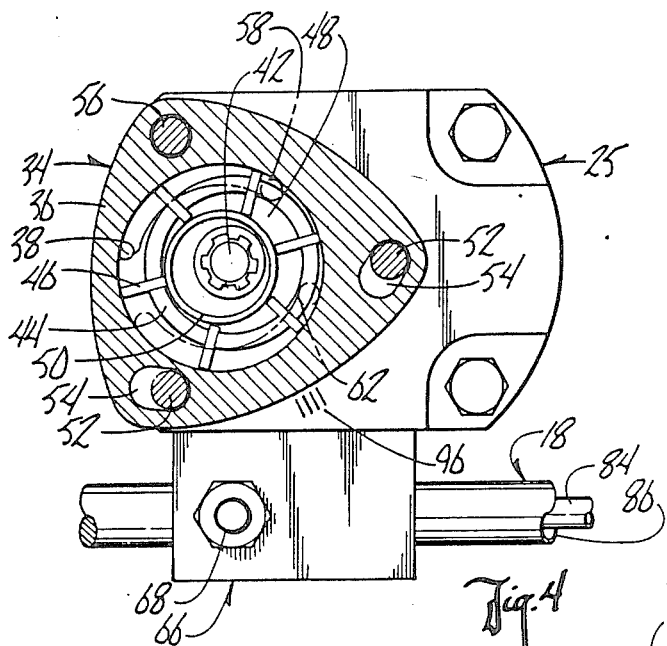
FIG. 4 is an enlarged scale plan view of the two pumps with the upper pump housing being shown in section to reveal the pump mechanism therein.

The numeral 10 designates a conventional sausage encasing machine, the major components of which are essentially shown in U.S. Pat. No. 3,115,668. These machines typically are comprised of a frame 12 and a plurality of legs 14. A pump assembly 16 is secured to the upper portion of frame 12 and is powered by a power mechanism (not shown) normally mounted within the frame. A stuffing horn assembly 18 is operatively reciprocally connected to the pump assembly. A chuck assembly 20 supports the outer end of stuffing horn assembly 18 and normally provides rotational motion to a casing mounted on a stuffing horn which extends into the chuck assembly.

A conventional linking mechanism 21 is located downstream from the chuck assembly 20. A discharge horn 22 is mounted downstream from the linking mechanism to receive the linked sausages or frankfurters. A conventional conveyor 24 is positioned downstream from the discharge horn and is adapted to receive the linked product from the discharge horn. All of these foregoing components are typically present in modern meat encasing machines, and do not of themselves constitute the essence of the present invention.

A lower pump 25 includes a lower pump housing 26 which is secured in any convenient fashion to the top of frame 12. Lower pump housing 26 has an outlet port 28 shown in dotted lines in FIG. 3. This pump housing also has an inlet port connected to a source of meat emulsion or the like, neither of which are shown.

Pump 25 is a conventional gear-type metering pump which include gears 30 which are rotatably powered by a shaft 32. Lower pump housing 26 can have a detachable cover 33 which is secured in place by any convenient means.

Upper pump 34 includes upper pump housing 36 which has a circular well 38 formed in its lower central portion. A center bore 40 is formed in the upper portion of well 38. The upper splined end portion 42 of shaft 32 extends upwardly through well 38 and terminates within center bore 40.

The pumping mechanism for pump 34 includes a cylindrical hub 44 which has a plurality of vanes 46 radially slidably mounted in radially disposed slots (not shown) in hub 44. Wells 48 are formed in the upper and lower surfaces of hub 44 and movably receive cylindrical rings 50 which are spaced from the spline portion 42 of shaft 32. The outer surfaces of the rings 50 engage the inner lower portions of each of the vanes 46.

Two bolts 52 extend through arcuate slots 54 which vertically extend through the upper pump housing 36 and are threadably secured in cover 33. This housing is pivotally secured to the lower pump housing 26 by means of bolt 56 which is threadably secured in cover 33.

Figure 5:
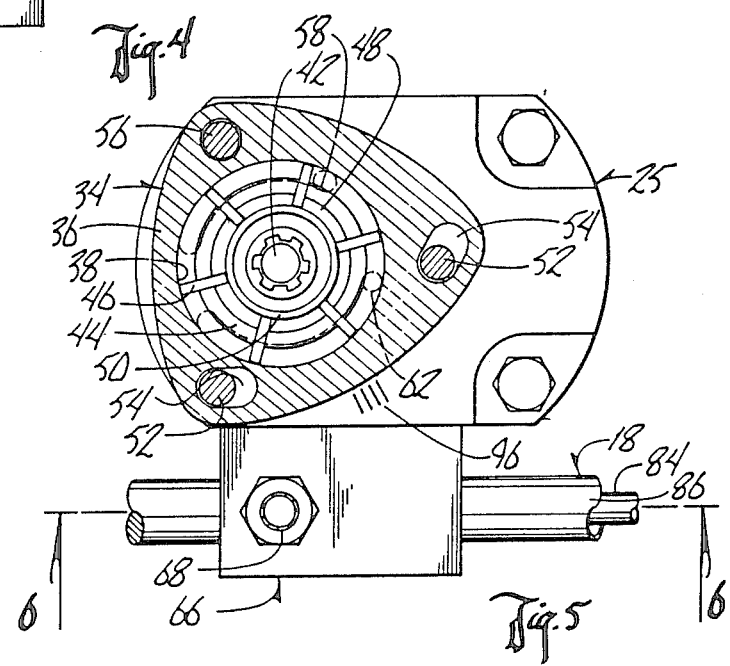
FIG. 5 is a view similar to that of FIG. 4 but shows the upper pump housing in an adjusted position with respect to the position shown in FIG. 4.

As shown by dotted lines in FIGS. 4 and 5, the upper pump 34 includes an intake port 58 which is in communication with an intake fitting 60, and this housing also has an outlet port 62 which is adapted to be connected to discharge material conduit 64 (See FIG. 2).

Upper pump 34 is a conventional vane-type pump. Its pumping capacity can be varied by pivoting the pump housing 36 in a horizontal plane with respect to the lower pump housing 26. This is accomplished merely by loosening the bolts 52 and 56. FIG. 5 illustrates a position of zero pumping capacity for the upper pump 34. When in this position, the rings 50 and vanes 46 are concentrically and symetrically positioned around the vertical axis of shaft 32. FIG. 4 shows that the upper pump housing 36 has been rotated in a slight counterclockwise direction with respect to the lower pump housing 26. FIG. 4 shows the upper pump in a position of maximum pumping capacity. Again, the structure of the upper pump 34 is conventional, and does not of itself comprise the essence of this invention.

As shown in FIGS. 2, 4, and 5, a mounting block 66 is secured in any convenient fashion to one side of the lower pump housing 26 of lower pump 25. The mounting block 66 has a first inlet port 68 which is in communication with an interior material compartment 69 (FIG. 7). A second inlet port 70 is in communication with the discharge port 28 of lower pump housing 26. The inlet port 70 terminates in an interior material compartment 72.

An elongated longitudinal bore 74 extends through mounting block 66 as shown in FIG. 7. The bore 74 extends "through" both of the material compartments 69 and 72. Appropriate annular grooves are formed around bore 74 at opposite sides of compartment 69 and adjacent the compartment 72 to receive sealing rings 76.

A cylindrical plug 78 is slidably mounted within bore 74. Plug 78 includes aperture 80 which extends completely therethrough and which is adapted to be in communication with material compartment 69 during the pumping operation.

An elongated bore 82 (FIG. 7) is formed in the inner end of plug 78 and is in communication with aperture 80. An inner horn 84 of smaller diameter is rigidly secured by any convenient means in the outer end of bore 82 (FIG. 7). A larger diameter outer horn 86 has one of its ends extending into and through the portion of bore 74 adjacent material compartment 72, and the end thereof is in communication with the compartment 72. A pair of elongated longitudinal tabs 88 extend longitudinally from the end of the outer horn 86, through compartment 72, and are received in slots 90 of plug 78. The ends of the tabs 88 are soldered or otherwise secured within slots 90.

Outer horn 86 (sometimes referred to as a stuffing tube or stuffing horn) is of conventional construction except for the tabs 88. It conventionally slidably extends from the pump to the chuck assembly 20. It can be slidably retracted from the chuck assembly to receive a shirred casing 92 which is mounted on the outside surface of horn 86 and abuts follower or keeper element 94. The inner horn 84 is concentrically mounted within outer horn 86. As shown in FIG. 2, the outer end of horn 84 may protrude slightly beyond the outer end of horn 86, although this arrangement is not absolutely necessary in the dual extrusion process.

An indicia mark 94 (FIG. 2) can be placed on the outside of upper pump housing 36. As explained hereafter, indicia mark 94 can be aligned with any one of a plurality of indicia marks 96 (FIG. 4) located on the top of cover 33 of the lower pump housing 26.

In operation, the position of the upper pump housing 36 can be adjusted to the desired position in the manner described heretofore to adjust the pumping capacity of the upper pump 34. Indicia marks 94 and 96 can be used to assist the operator in securing the upper pump housing 36 in a given desired position. The power plant of the machine 20 is then started by conventional means to cause shaft 32 to rotate. This causes the pumping mechanism of both pumps 25 and 34 to commence. Typically, a quantity of cheese, chili, or other condiment is operatively connected to the inlet port 58 of the upper pump to assist the operator in securing the upper pump housing 36 in a given desired position. The power plant of the machine 20 is then started by conventional means to cause shaft 32 to rotate. This causes the pumping mechanism of both pumps 25 and 34 to commence. Typically, a quantity of cheese, chili, or other condiment is operatively connected to the inlet port 58 of the upper pump 34. Similarly, a conventional supply of meat emulsion is made available to the inlet port of the lower pump 25.

The operation of the two pumps causes meat emulsion to flow into material compartment 72 of mounting block 66, and thence into the end of outer horn 86. Little if any interference in this flow is provided by the tabs 88 which extend across the material compartment 72.

At the same time, condiment material is being pumped from the upper pump 34 through conduit 64 and into inlet port 68 of mounting block 66. This material flows into aperture 80, thence into longitudinal bore 82, and thence into the end of inner horn 84.

Figure 6:
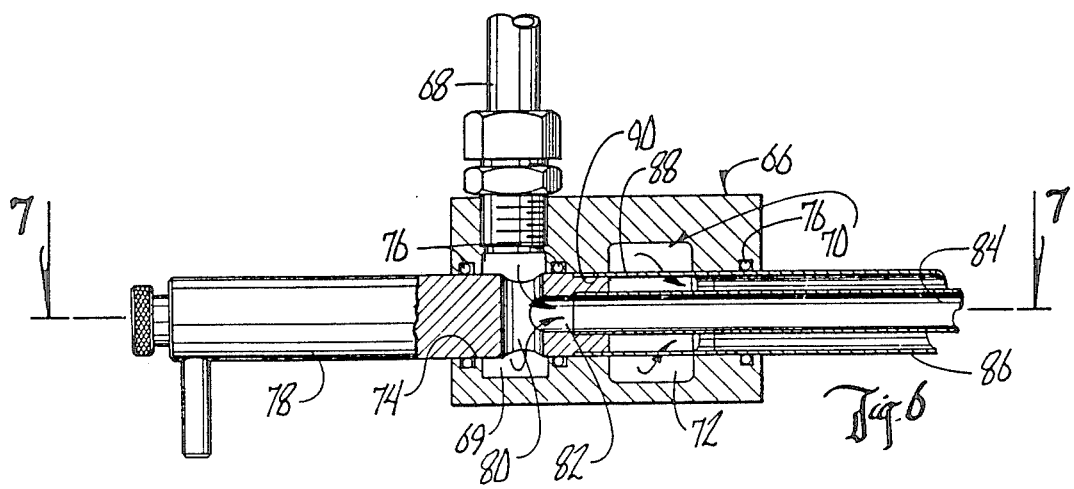
FIG. 6 is a partial sectional view taken on line 6—6 of FIG. 5.

The flow of meat emulsion into outer horn 86 is generally shown by the arrows 98 in FIG. 6. Similarly, the flow of condiment material into the end of inner horn 84 is generally shown by the arrows 100 in FIG. 6.

Since the two pumps 25 and 34 are powered by the same shaft 32, their pumping action is always precisely coordinated. By being able to adjust the pumping capacity of the upper pump 34, the flow of condiment material can be also carefully controlled. Once the pumping capacity of the upper pump 34 is adjusted to the desired flow, the pumping capacity of the two pumps will always remain precisely coordinated even though the rotational speed of shaft 32 is varied.

The pumped material of this invention is adapted to have substantially free flowing characteristics so that the material is not damaged while en route. The structure of this invention is simple, strong, and is easily cleaned. Accordingly, it is seen that this invention accomplishes at least its stated objectives.

I claim:

1. A compound pump mechanism, comprising,
   a first pump housing,
   a first pump mechanism in said first pump housing,
   inlet and outlet ports in said first pump housing in communication with said first pump mechanism for delivering to and from said first pump housing the material to be pumped,
   a drive shaft in said first pump housing and connected to a source of rotational power and to said first pump mechanism to cause said first pump mechanism to pump material delivered to said inlet port through said first pump mechanism and out said outlet port,
   a second pump housing mounted on said first pump housing,
   a second pump mechanism in said second pump housing,
   inlet and outlet ports in said second pump housing in communication with said second pump mechanism for delivering to and from said second pump housing the material to be pumped,
   said drive shaft in said first pump housing extending into said second pump housing and connected to said second pump mechanism, whereby rotation of said drive shaft will operate both said first and second pump mechanisms.

2. The device of claim 1 wherein material delivery means are associated with each of said first and second pump housings wherein material can be delivered to the inlet ports of both of said first and second pump housings.

3. The device of claim 2 wherein adjustment means are associated with said second pump housing wherein the material pumping capacity of said second pumping mechanism can be adjusted.

4. The device of claim 3 wherein said adjustment means comprises a pivoted connection between said first and second pump housings wherein one of said pump housings can be selectively pivoted with respect to the position of said other pump housing to selectively position said second pump housing with respect to said drive shaft and said second pump mechanism to vary the pumping capacity of said second pump mechanism.

5. The device of claim 1 wherein conduit means are connected to the outlet ports of said first and second pump housings to bring the material pumped from said housings together to form a product from said pumped materials.

6. The device of claim 5 wherein said conduit means comprises separate conduits which bring said pumped material to the inlet ports of inner and outer concentrically mounted stuffing horns on a meat encasing machine.

7. The device of claim 6 wherein said meat encasing machine includes a mounting block with a pair of separate material receiving ports therein connected to said separate conduits, the inlet ports of said stuffing horns each being in communication with one of said material receiving ports.

8. The device of claim 7 wherein the inlet ports of said stuffing horns are one of the ends of said stuffing horns which are mounted with said mounting block.

9. The device of claim 7 wherein the inlet port of the inner of said concentrically mounted stuffing horns is adapted to receive pumped material from said second pump mechanism, and the outer of said stuffing horns is adapted to receive pumped material from said first pump mechanism.

10. The device of claim 8 wherein the inlet port of the inner of said concentrically mounted stuffing horns is adapted to receive pumped material from said second pump mechanism, and the outer of said stuffing horns is adapted to receive pumped material from said first pump mechanism.

11. The device of claim 7 wherein said mounting block has a horizontal bore extending therethrough, a plug element having a diameter substantially the same as that of said bore and having one end extending into said bore adjacent one of said material receiving ports connected by one of said separate conduits to the outlet port of said second pump housing, a transverse bore in said plug element adjacent said one of said material receiving ports, a longitudinal bore in said one end of said plug element and communicating with a transverse bore, one of the ends of the inner stuffing horn being mounted in said longitudinal bore, and one of the ends of said outer stuffing horn being in communication with the other of said material receiving ports.

12. The device of claim 11 wherein said one end of said outer stuffing horn has two separate spaced longitudinal tabs extending in a longitudinal direction and secured to said one end of said plug, said tabs being positioned adjacent the other of said material receiving ports so that said outer stuffing horn can receive pumped material from said first pumping mechanism by flowing around and between said tabs into said outer stuffing horn.

13. The device of claim 12 wherein said inner stuffing tube has a diameter less than the interior diameter of said outer stuffing tube, and said inner stuffing tube extends through the space between said tabs.

14. The device of claim 1 wherein said first pump mechanism is a metering gear pump mechanism, and said second pump mechanism is a vane pump mechanism.

15. The device of claim 11 wherein said one end of said outer stuffing horn has at least one longitudinal tab extending in a longitudinal direction and secured to said one end of said plug, said tab being positioned adjacent the other of said material receiving ports so that said outer stuffing horn can receive pumped material from said first pumping mechanism by flowing around said tab into said outer stuffing horn.

16. A mounting block for receiving separate pumped materials for introduction into the ends of concentrically positioned inner and outer stuffing horns for meat encasing machines, comprising, a mounting block having a horizontal bore extending therethrough, and having first and second material receiving ports therein, a plug element having a diameter substantially the same as said bore and having one end extending into said bore adjacent said first material receiving port, a transverse bore in said plug element adjacent said first material receiving port, a longitudinal bore in said one end of said plug element and communicating with said transverse bore, one end of said inner stuffing horn being mounted in said longitudinal bore, and one end of said outer stuffing horn being in communication with said second material receiving port.

17. The device of claim 16 wherein said one end of said outer stuffing horn has two separate spaced longitudinal tabs extending in a longitudinal direction and secured to said one end of said plug, said tabs being positioned adjacent said second material receiving port so that material from said second material receiving port can enter said outer stuffing tube by flowing through the space between said tabs.

18. The device of claim 17 wherein said inner stuffing horn has a diameter less than the interior diameter of said outer stuffing horn, and said inner stuffing horn extends through the space between said tabs.

19. The device of claim 16 wherein said one end of said outer stuffing horn has at least one longitudinal tab extending in a longitudinal direction and secured to said one end of said plug, said tab being positioned adjacent the other of said material receiving ports so that said outer stuffing horn can receive pumped material from said first pumping mechanism by flowing around said tab into said outer stuffing horn.

20. In a meat encasing machine including a first metering pump having an inlet and an outlet, a second metering pump having an inlet and an outlet, a source of flowable meat material connected to the inlet of said first pump, a source of flowable condiment material connected to the inlet of said second pump, a reciprocating stuffing horn assembly mounted on said machine for movement between an advanced position and a retracted position, said stuffing horn assembly including an elongated cylindrical outer stuffing horn having an open forward end defining a discharge outlet, said outer stuffing horn having an inner end defining an inlet opening, an elongated cylindrically shaped inner stuffing horn positioned concentrically within said outer stuffing horn and being spaced radially inwardly therefrom to define a cylindrical chamber between the inner and outer stuffing horns, said inner stuffing horn having an open front end defining a discharge outlet and an open inner end defining an inlet opening, the invention comprising, a mounting block with a pair of separate material receiving ports therein connected, respectively, to the outlets of said first and second pumps, the inner end of said inner stuffing horn being in communication with the material receiving port connected to said second pump, and the inner end of said outer stuffing horn being connected to the material receiving port connected to said first pump.

21. The device of claim 20 wherein said mounting block has a horizontal bore extending therethrough, a plug element having a diameter substantially the same as that of said bore and having one end extending into said bore adjacent one of said material receiving ports connected to said second pump, a transverse bore in said plug element adjacent said one of said material receiving ports, a longitudinal bore in said one end of said plug element and communicating with said transverse bore, the inner end of said inner stuffing horn being mounted in said longitudinal bore, and the inner end of said outer stuffing horn being in communication with said material receiving port connected to said first pump.

22. The device of claim 21 wherein said one end of said outer stuffing horn has at least one longitudinal tab extending in a longitudinal direction and secured to said one end of said plug.

23. The device of claim 20 wherein said first and second pumps each have pumping mechanisms connected to a single power shaft.

24. The device of claim 23 wherein the pumping capacity of said second pump can be selectively adjusted.

* * * * *

UNITED STATES PATENT AND TRADEMARK OFFICE
CERTIFICATE OF CORRECTION

PATENT NO. : 4,694,536

DATED : September 22, 1987

INVENTOR(S) : Ray T. Townsend

It is certified that error appears in the above-identified patent and that said Letters Patent is hereby corrected as shown below:

Col. 4 lines 51-57 "delete".

Signed and Sealed this

Nineteenth Day of January, 1993

Attest:

DOUGLAS B. COMER

Attesting Officer

Acting Commissioner of Patents and Trademarks